(12) United States Patent
Park et al.

(10) Patent No.: US 12,339,698 B2
(45) Date of Patent: Jun. 24, 2025

(54) ELECTRONIC DEVICE CONTROLLING FREQUENCY OF CLOCK SIGNAL AND METHOD OF OPERATING THE ELECTRONIC DEVICE

(71) Applicant: Samsung Electronics Co., Ltd., Suwon-si (KR)

(72) Inventors: Jonglae Park, Seoul (KR); Hanjun Shin, Seoul (KR); Hyunji Hong, Seoul (KR); Choonghoon Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/498,019

(22) Filed: Oct. 11, 2021

(65) Prior Publication Data

US 2022/0187866 A1    Jun. 16, 2022

(30) Foreign Application Priority Data

Dec. 14, 2020   (KR) ........................ 10-2020-0174728

(51) Int. Cl.
*G06F 1/08* (2006.01)
*G06F 1/324* (2019.01)

(52) U.S. Cl.
CPC ................ *G06F 1/08* (2013.01); *G06F 1/324* (2013.01)

(58) Field of Classification Search
CPC ... G06F 1/08; G06F 1/324; G06F 1/28; G06F 1/14; G06F 13/4291; Y02D 30/70; Y02D 10/00
See application file for complete search history.

(56) References Cited

U.S. PATENT DOCUMENTS

| 7,730,340 | B2 | 6/2010 | Hu et al. |
| 8,250,395 | B2 | 8/2012 | Carter et al. |
| 8,589,718 | B2 | 11/2013 | Lin et al. |
| 8,812,808 | B2 | 8/2014 | Eyerman et al. |
| 9,369,040 | B1 | 6/2016 | Dosluoglu et al. |
| 9,417,927 | B2 | 8/2016 | Abraham et al. |
| 9,778,676 | B2 | 10/2017 | Pal et al. |
| 9,851,774 | B2 | 12/2017 | Priyadarshi et al. |
| 9,864,426 | B2 | 1/2018 | Dosluoglu et al. |
| 10,475,501 | B2 | 11/2019 | Jeon et al. |
| 10,496,149 | B2 | 12/2019 | Lee et al. |

(Continued)

FOREIGN PATENT DOCUMENTS

KR    2019-0019295 A    2/2019

OTHER PUBLICATIONS

Hoglund, Voltage and frequency scaling in an embedded microprocessor, Dec. 13, 2009 (Year: 2009).*

*Primary Examiner* — Paul Yen
(74) *Attorney, Agent, or Firm* — Harness, Dickey & Pierce, P.L.C.

(57) ABSTRACT

An electronic device includes a clock management unit configured to generate a clock signal, an intellectual property (IP) device configured to receive the clock signal and is configured to perform a task according to the clock signal in an active state, a first counter configured to count cycles of the clock signal while the IP device is in the active state, and is configured to generate a first count, and a frequency controller configured to control the clock management unit to change a frequency of the clock signal when the first count reaches a first reference count.

18 Claims, 12 Drawing Sheets

(56) References Cited

U.S. PATENT DOCUMENTS

| | | | |
|---|---|---|---|
| 2005/0125705 A1* | 6/2005 | Cheng | G06F 1/3203 |
| | | | 713/322 |
| 2013/0155073 A1* | 6/2013 | Khodorkovsky | G09G 5/363 |
| | | | 345/501 |
| 2017/0351316 A1* | 12/2017 | Vratonjic | G06F 1/324 |
| 2018/0181183 A1 | 6/2018 | Yoon et al. | |
| 2019/0332445 A1* | 10/2019 | Shimizu | G06F 1/08 |
| 2019/0354156 A1 | 11/2019 | Liu et al. | |

* cited by examiner

# ELECTRONIC DEVICE CONTROLLING FREQUENCY OF CLOCK SIGNAL AND METHOD OF OPERATING THE ELECTRONIC DEVICE

CROSS-REFERENCE TO RELATED APPLICATION

This application is based on and claims priority under 35 U.S.C. § 119 to Korean Patent Application No. 10-2020-0174728, filed on Dec. 14, 2020, in the Korean Intellectual Property Office, the disclosure of which is incorporated by reference herein in its entirety.

BACKGROUND

The inventive concepts relate to an electronic device, and more particularly, to an electronic device configured to control the frequency of a clock signal and a method of operating the electronic device.

With the development of technology, power management of computing systems, for example, mobile devices, is important. Accordingly, a mobile device is configured to perform a dynamic voltage and frequency scaling (DVFS) operation to adjust frequencies and voltages in the mobile device, thereby controlling performance and/or power consumption. When the frequencies and the voltages are adjusted for each predetermined or alternatively, desired period, the utilization rate of the mobile device may not be immediately reflected in the DVFS operation.

SUMMARY

The inventive concepts relate to an electronic device configured to control the frequency of a clock signal, and is configured to provide an electronic device that independently controls a time point at which frequency up scaling is performed and a time point at which frequency down scaling is performed.

According to an aspect of the inventive concepts, there is provided an electronic device including a clock management unit configured to generate a clock signal, an intellectual property (IP) device configured to receive the clock signal and is configured to perform a task according to the clock signal in an active state, a first counter configured to count cycles of the clock signal while the IP device is in the active state, and is configured to generate a first count, and a frequency controller configured to control the clock management unit to change a frequency of the clock signal when the first count reaches a first reference count.

According to another aspect of the inventive concepts, there is provided an electronic device including a clock management unit configured to generate a first clock signal and a second clock signal, a first intellectual property (IP) device configured to receive the first clock signal and is configured to output a task request according to the first clock signal in an active state, a second IP device configured to receive the task request from the first IP device according to the second clock signal, a first active counter configured to generate a first active count by counting cycles of the first clock signal received by the first IP device while the first IP device is in the active state, and is configured to output a first initiation signal when the first active count reaches a first reference count, a first total counter configured to generate a first total count by counting, regardless of the active state of the first IP device, the cycles of the first clock signal received by the first IP device, and is configured to output a second initiation signal when the first total count reaches a second reference count, and a frequency controller configured to control the clock management unit to change a frequency of the second clock signal, in response to the first initiation signal or the second initiation signal.

According to another aspect of the inventive concepts, there is provided a method of operating an electronic device, the method including setting, to initial values, an active count corresponding to a number of active cycles of a clock signal provided to an intellectual property (IP) device and a total count corresponding to a number of total cycles of the clock signal, counting the active cycles and the total cycles of the clock signal, and changing a frequency of the clock signal based on whether the active count reaches a first reference count or whether the total count reaches a second reference count.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Hereinafter, various example embodiments of the inventive concepts will be described with reference to the accompanying drawings.

Figure 1:
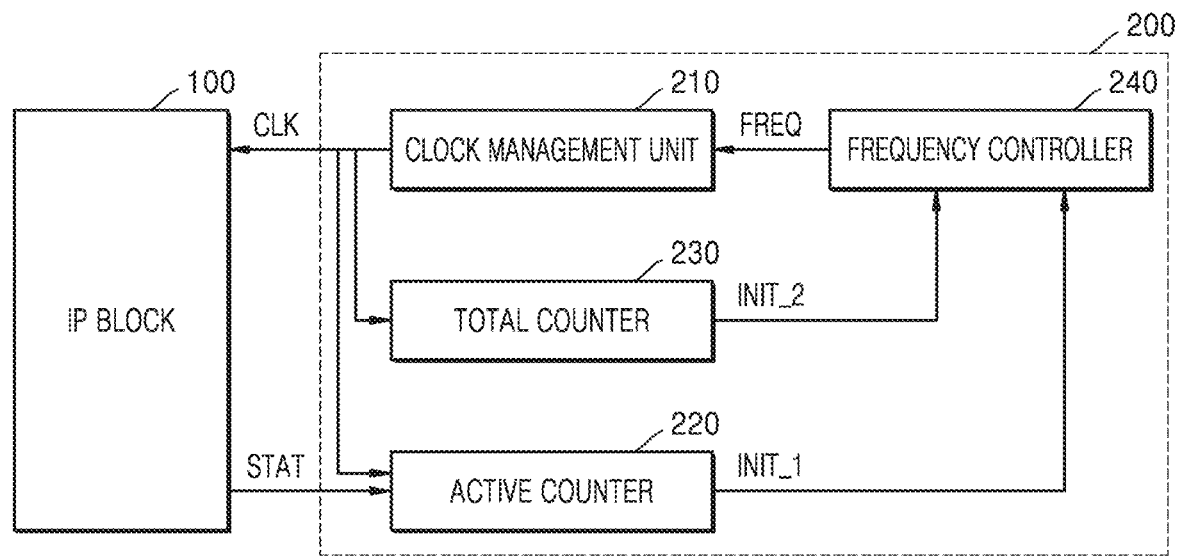
FIG. 1 is a diagram illustrating an electronic device according to example embodiments of the inventive concepts.

FIG. 1 is a diagram illustrating an electronic device 10 according to example embodiments of the inventive concepts.

Referring to FIG. 1, the electronic device 10 may include an intellectual property (IP) block 100 and a clock provider 200. The clock provider 200 may include a clock management unit 210, an active counter 220, a total counter 230, and/or a frequency controller 240.

The IP block 100 may denote a circuit, logic, or a combination thereof that may be integrated in the electronic device 10. The IP block 100 may be in at least one of an active state or an idle state depending on whether or not the IP block 100 operates. That is, the IP block 100 may perform a task when the IP block 100 is in an active state and may not perform a task when the IP block 100 is an idle state. The IP block 100 may receive a clock signal CLK from the clock management unit 210 and may perform a task according to the clock signal CLK when the IP block 100 is in an active state. The IP block 100 may be included in at least one of a central processing unit (CPU), a graphics processing unit (GPU), a neural network processing unit (NPU), or an image signal processor (ISP).

The clock management unit 210 may provide the clock signal CLK to the IP block 100. The clock management unit 210 may include a clock signal generation circuit such as a phase locked loop (PLL), a delayed locked loop (DLL), or a crystal oscillator. The clock management unit 210 may adjust the frequency of the clock signal CLK according to frequency information FREQ received from the frequency controller 240.

The active counter 220 may monitor the clock signal CLK provided to the IP block 100. For example, the active counter 220 may count active cycles of the clock signal CLK. The active cycle may be a cycle of a clock signal applied to the IP block 100 when the IP block 100 is in an active state. The active counter 220 may generate an active count according to the number of active cycles. In a count-up manner, when the active cycle increases by 1, the active count may also increase by 1. In a count-down manner, when the active cycle increases by 1, the active count may decrease by 1. The active counter 220 may output a first initiation signal when the active count reaches a first reference count. The active counter 220 may control the frequency controller 240 to output frequency information FREQ by outputting the first initiation signal. The active counter 220 may include at least one flip-flop.

The total counter 230 may monitor the clock signal CLK provided to the IP block 100. For example, the total counter 230 may count total cycles of the clock signal CLK. The total cycle may be a cycle of a clock signal applied to the IP block 100 regardless of the operation state of the IP block 100. That is, when the IP block 100 is in an active state as well as in an idle state, the number of total cycles may increase. The total counter 230 may generate a total count according to the number of total cycles. In the count-up manner, when the total cycle increases by 1, the total count may also increase by 1. In the count-down manner, when the total cycle increases by 1, the total count may decrease by 1. The total counter 230 may output a second initiation signal when the total count reaches a second reference count. The total counter 230 may control the frequency controller 240 to output frequency information FREQ by outputting the second initiation signal. The total counter 230 may include at least one flip-flop.

The frequency controller 240 may receive the first initiation signal or the second initiation signal and generate frequency information FREQ about the frequency of the clock signal CLK. The frequency controller 240 may generate frequency information FREQ indicating a frequency higher than an existing frequency of the clock signal CLK in response to the first initiation signal received from the active counter 220. The frequency controller 240 may generate frequency information FREQ indicating a frequency lower than the existing frequency of the clock signal CLK in response to the second initiation signal received from the total counter 230. The clock management unit 210 may receive frequency information FREQ from the frequency controller 240 and provide a clock signal CLK having a changed frequency to the IP block 100. Because a time point at which the frequency controller 240 outputs the frequency information FREQ is determined through different counters, that is, the active counter 220 and the total counter 230, a time point at which the frequency rises and a time point at which the frequency falls may be different from each other.

When receiving the first initiation signal, the frequency controller 240 may determine the frequency of the clock signal CLK based on the total count. For example, the frequency controller 240 may obtain a total count from the total counter 230 when receiving the first initiation signal, and may generate frequency information FREQ so that the frequency increases as the obtained total count decreases. When receiving the second initiation signal, the frequency controller 240 may determine the frequency of the clock signal CLK based on the active count. For example, the frequency controller 240 may obtain an active count from the active counter 220 when receiving the second initiation signal, and may generate frequency information FREQ so that the frequency decreases as the obtained active count decreases.

The electronic device 10 according to example embodiments may increase the frequency of the clock signal CLK according to the first initiation signal output from the active counter 220 and decrease the frequency of the clock signal CLK according to the second initiation signal output from the total counter 230. Accordingly, a time point at which the frequency of the clock signal CLK increases and a time point at which the frequency of the clock signal CLK decreases may be different from each other. In addition, according to example embodiments, when the active count quickly reaches the first reference count, the time point at which the frequency of the clock signal CLK increases may be accelerated. Accordingly, because a time point for a frequency change varies according to the operation state of the IP block 100, the electronic device 10 according to example embodiments may provide a frequency change operation suitable for the operation state of the IP block 100.

Figure 2:
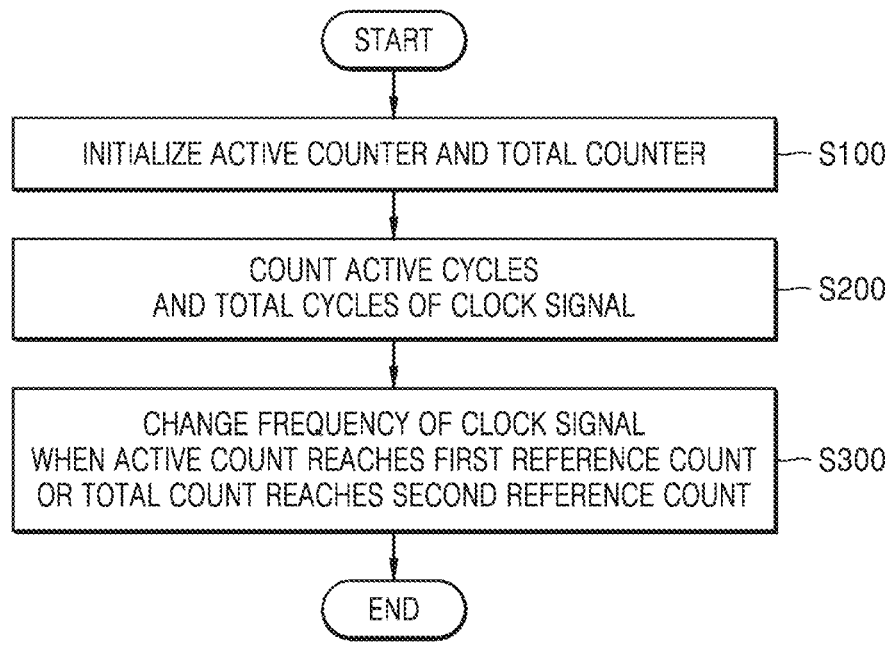
FIG. 2 is a flowchart illustrating a method of operating an electronic device, according to example embodiments of the inventive concepts.

FIG. 2 is a flowchart illustrating a method of operating an electronic device, according to example embodiments of the inventive concepts.

Referring to FIG. 2, the method of operating an electronic device may include operations S100 to S300. In operation S100, the electronic device 10 may initialize the active counter 220 and the total counter 230. For example, a first reference count and a second reference count may be set, and an active count and a total count may be set to initial values. In a count-up manner, the first reference count and the second reference count may be values greater than 0, and initial values of the active count and the total count may be 0. In a count-down manner, the first reference count and the second reference count may be 0, and initial values of the active count and the total count may be greater than 0. However, example embodiments of the inventive concepts are not limited thereto.

In operation S200, the active counter 220 may count active cycles of the clock signal CLK, and the total counter 230 may count total cycles of the clock signal CLK. The active cycle and the total cycle may be counted in the count-up manner or the count-down manner. The count-up manner may be a method of increasing a count value as the number of cycles increases, and the count-down manner may be a method of decreasing a count value as the number of cycles increases.

In operation S300, the electronic device 10 may change the frequency of the clock signal CLK when the active count reaches the first reference count or the total count reaches the second reference count. When the active count reaches the first reference count, the electronic device 10 may increase the frequency of the clock signal CLK. The electronic device 10 may determine an increased frequency level based on the total count. When the total count reaches the second reference count, the electronic device 10 may decrease the frequency of the clock signal CLK. The electronic device 10 may determine a decreased frequency level based on the active count.

In the method of operating an electronic device according to example embodiments of the inventive concepts, a frequency change operation suitable for the operation state of the IP block 100 may be provided by distinguishing a time point at which a frequency increases from a time point at which a frequency decreases.

Figure 3:
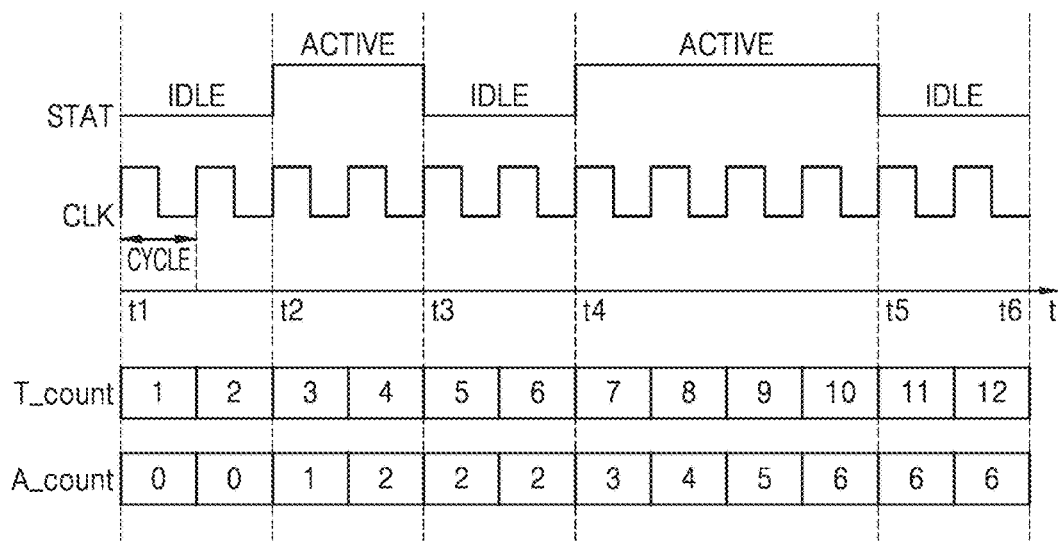
FIG. 3 is a diagram illustrating an active count and a total count according to example embodiments of the inventive concepts.

FIG. 3 is a diagram illustrating an active count and a total count according to example embodiments of the inventive concepts.

Referring to FIG. 3, the clock signal CLK may be periodically toggled according to time. The clock signal CLK corresponding to one period may be referred to as a cycle. For example, as shown in FIG. 3, the clock signal CLK defined between adjacent rising edges may be a cycle. Depending on the state of the IP block 100, a status signal STAT may be maintained at logic high or logic low. For example, when the IP block 100 is in an active state, the status signal STAT may be maintained at logic high, and when the IP block 100 is in an idle state, the status signal STAT may be maintained at logic low. However, example embodiments of the inventive concepts are not limited thereto, and when the IP block 100 is in an active state, the status signal STAT may be maintained at logic low, and when the IP block 100 is in an idle state, the status signal STAT may be maintained at logic high. The IP block 100 may perform a task when the IP block 100 is in an active state, and may not perform a task when the IP block 100 is in an idle state.

While the status signal STAT indicates an active state, a cycle of the clock signal CLK provided to the IP block 100 may be referred to as an active cycle. For example, cycles between a second time point t2 and a third time point t3 and cycles between a fourth time point t4 and a fifth time point t5 may be active cycles. Regardless of the status signal STAT, a cycle of the clock signal CLK provided to the IP block 100 may be referred to as a total cycle. For example, cycles between a first time point t1 and a sixth time point t6 may be a total cycle.

In the count-up manner, the total count may increase during the entire period in which the clock signal CLK is toggled. That is, when the number of total cycles increases by 1, the total count may also increase by 1. Also, while the status signal STAT indicates an active state, the active count may increase. That is, when the number of active cycles increases by 1, the active count may increase by 1. For example, when the initial values of the total count and the active count are 0 at the first time point t1, the total count may be 12 at the sixth time point t6 and the active count may be 2 at the third time point t3.

In the count-up manner, the total count may decrease during the entire period in which the clock signal CLK is toggled. That is, when the number of total cycles increases by 1, the total count may decrease by 1. Also, while the status signal STAT indicates an active state, the active count may decrease. That is, when the number of active cycles increases by 1, the active count may decrease by 1. For example, when at the first time point t1 the initial value of the total count is 12 and the initial value of the active count is 5, the total count may be 0 at the sixth time point t6 and the active count may be 3 at the second time point t2.

The electronic device 10 according to example embodiments of the inventive concepts may separately include an active count for counting an active cycle and a total count for counting a total cycle and accordingly, may individually control a time point at which the frequency of a clock signal increases and a time point at which the frequency of the clock signal decreases.

Figure 4:
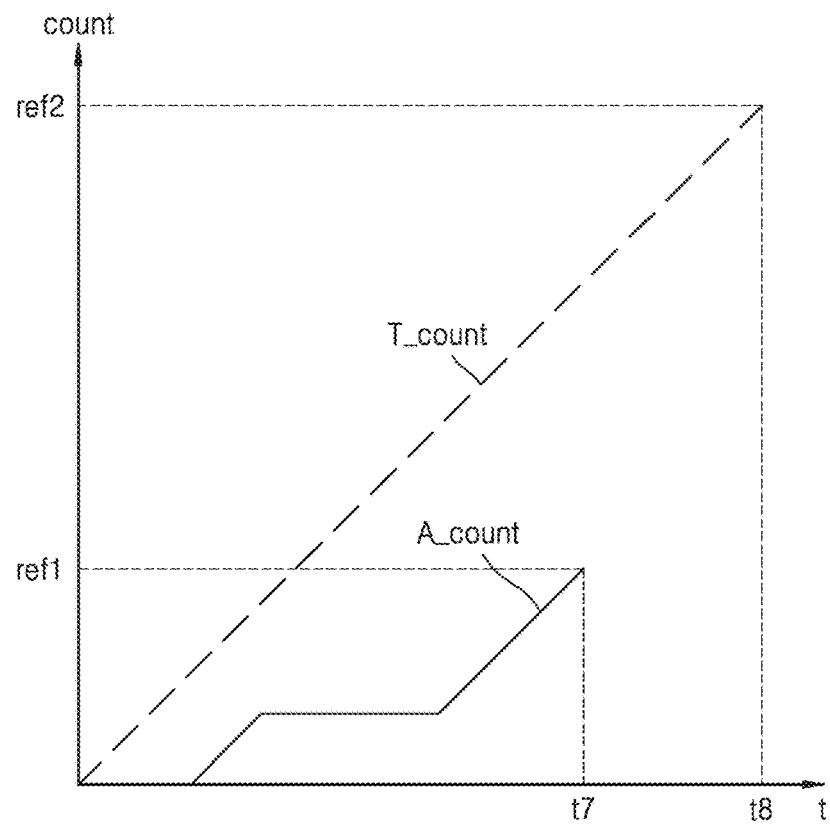
FIG. 4 is a diagram illustrating a frequency change time point according to example embodiments of the inventive concepts.

FIG. 4 is a diagram illustrating a frequency change time point according to example embodiments of the inventive concepts.

Referring to FIG. 4, a total count T_count and an active count A_count may increase with time. That is, although FIG. 4 illustrates a count-up manner, example embodiments of the inventive concepts are not limited thereto. That is, according to the count-down manner, the total count T_count and the active count A_count may each decrease with time from an initial value greater than 0.

The active count A_count may represent the number of active cycles of the clock signal CLK that is toggled while the status signal STAT indicates an active state, and the total count T_count may represent the number of total cycles of the clock signal CLK regardless of the status signal STAT.

The active count A_count may reach a first reference count ref1 at a seventh time point t7. The active counter 220 may provide a first initiation signal to the frequency controller 240 at the seventh time point t7. The total count T_count may reach a second reference count ref2 at an eighth time point t8. The total counter 230 may provide a second initiation signal to the frequency controller 240 at the eighth time point t8.

The frequency controller 240 may output frequency information indicating an increased frequency in response to the first initiation signal, and may output frequency information indicating a decreased frequency in response to the second initiation signal.

That is, the electronic device 10 according to example embodiments of the inventive concepts may individually control a time point at which the frequency of the clock signal CLK increases and a time point at which the frequency of the clock signal CLK decreases.

Figure 5:
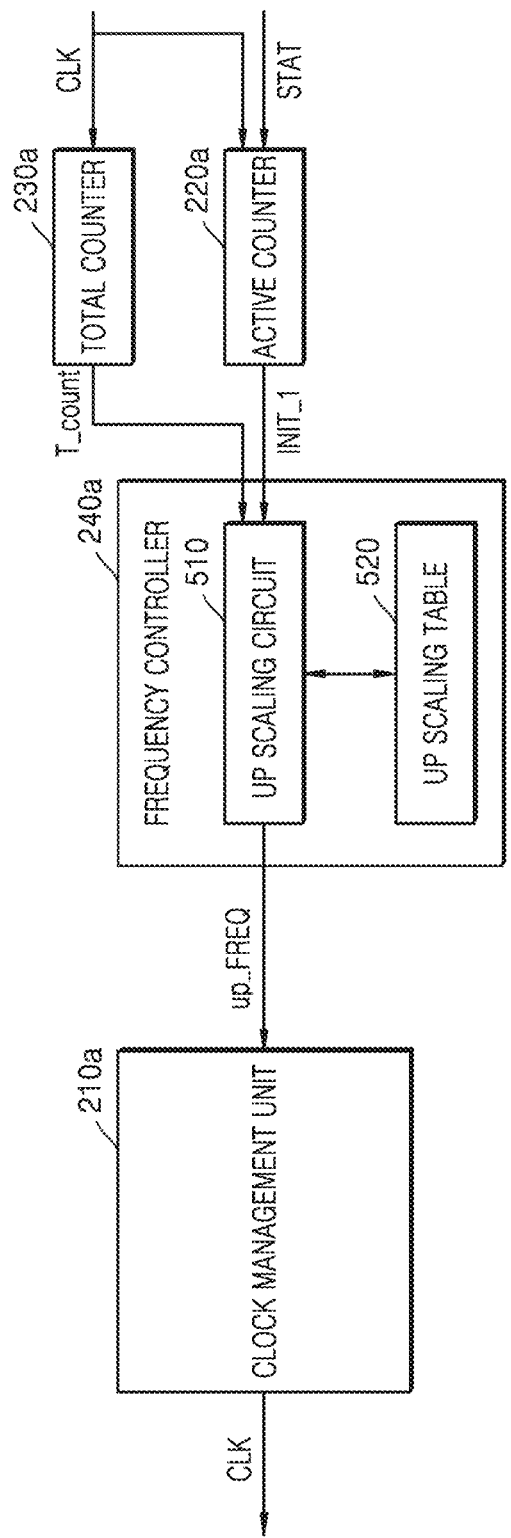
FIG. 5 is a diagram illustrating a process of increasing a frequency, according to example embodiments of the inventive concepts.

FIG. 5 is a diagram illustrating a process of increasing a frequency, according to example embodiments of the inventive concepts.

Referring to FIG. 5, a frequency controller 240a may include an up scaling circuit 510 and an up scaling table 520. The up scaling circuit 510 may receive a first initiation signal INIT_1 from an active counter 220a and output an up frequency up_FREQ higher than an existing frequency of a clock signal CLK. The up scaling circuit 510 may receive the first initiation signal INIT_1 and obtain a total count T_count from a total counter 230a. For convenience of description, the total count T_count and the active count A_count may be described later as being determined according to a count-up manner. However, example embodiments of the inventive concepts are not limited thereto, and the total count T_count and the active count A_count may be determined according to a count-down manner.

The up scaling circuit 510 may obtain an up frequency up_FREQ corresponding to the total count T_count by referring to the up scaling table 520. When the total count T_count obtained in response to the first initiation signal INIT_1 is relatively small, it may be understood that the active count A_count relatively quickly reaches the first reference count ref1. When the total count T_count obtained in response to the first initiation signal INIT_1 is relatively large, it may be understood that the active count A_count relatively slowly reaches the first reference count ref1. That is, the utilization of the IP block may be derived at a time point at which the first initiation signal INIT_1 is output through the total count T_count.

In some example embodiments, the up scaling circuit 510 may calculate the up frequency up_FREQ based on the total count T_count without referring to the up scaling table 520. For example, the up scaling circuit 510 may calculate the up frequency up_FREQ by adding a larger offset to the existing frequency as the total count T_count decreases. Alternatively, the up scaling circuit 510 may calculate the up frequency up_FREQ by multiplying a larger gain by the existing frequency as the total count T_count decreases.

A clock management unit 210a may receive the up frequency up_FREQ from the up scaling circuit 510 and output a clock signal CLK having the up frequency up_FREQ.

The up scaling circuit 510 according to example embodiments of the inventive concepts may obtain a total count T_count in response to the first initiation signal INIT_1 and determine the frequency of the clock signal CLK by referring to the up scaling table 520.

Figure 6:
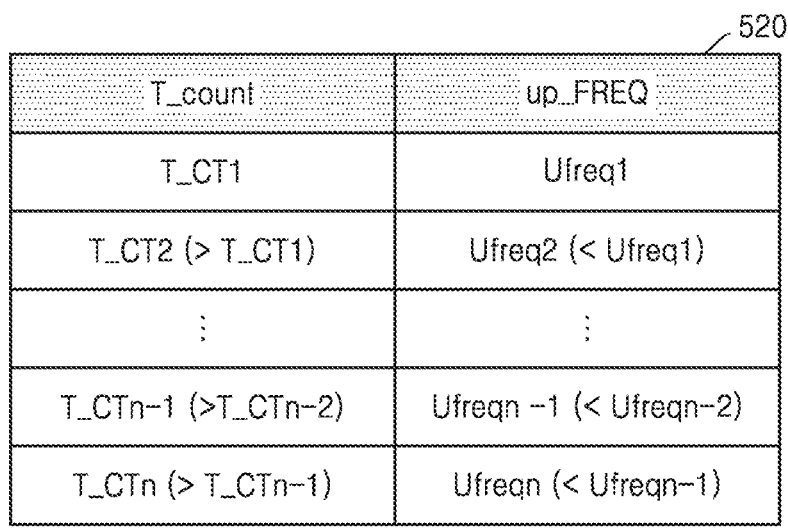
FIG. 6 is a diagram illustrating an up scaling table according to example embodiments of the inventive concepts.

FIG. 6 is a diagram illustrating an up scaling table according to example embodiments of the inventive concepts.

Referring to FIG. 6, an up scaling table 520 may include a relationship between a total count T_count and an up frequency up_FREQ. The total count T_count may be one of first to n-th total counts T_CT1 to T_CTn, and the up frequency up_FREQ may be one of first to n-th up frequencies Ufreq1 to Ufreqn. The first to n-th total counts T_CT1 to T_CTn may correspond to the first to n-th up frequencies Ufreq1 to Ufreqn, respectively.

A total count T_count that is relatively large may correspond to an up frequency up_FREQ that is relatively low. For example, the n-th total count T_CTn may be greater than the (n−1)-th total count T_CTn−1, and the n-th up frequency Ufreqn may be less than the (n−1)-th up frequency Ureqn−1.

The utilization of the IP block 100 may be derived by a total count T_count obtained in response to the first initiation signal INIT_1. That is, when the active count A_count reaches the first reference count ref1, it may be understood that the total count T_count and the utilization of the IP block 100 are inversely proportional to each other. Accordingly, the up scaling circuit 510 according to example embodiments of the inventive concepts may obtain a total count T_count in response to the first initiation signal INIT_1 and may perform a DVFS operation according to the utilization of the IP block 100 by outputting an up frequency up_FREQ corresponding to the total count T_count.

Figure 7:
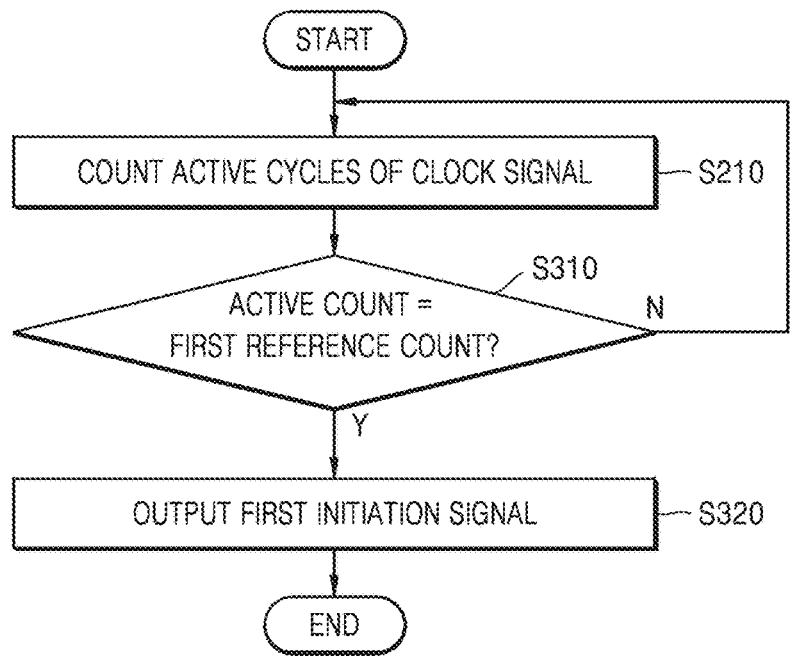
FIG. 7 is a flowchart illustrating an example of a method of operating an active counter, according to example embodiments of the inventive concepts.

FIG. 7 is a flowchart illustrating an example of a method of operating an active counter, according to example embodiments of the inventive concepts.

Referring to FIG. 7, in operation S210, the active counter 220a may count active cycles of the clock signal CLK. For example, in the count-up manner, while the status signal STAT indicates an active state, the active counter 220a may increase the active count A_count. That is, when the number of active cycles increases by 1, the active count A_count may also increase by 1. In the count-down manner, while the status signal STAT indicates an active state, the active counter 220a may decrease the active count A_count. That is, when the number of active cycles increases by 1, the active count A_count may decrease by 1. For convenience of description, a method of operating the active counter 220a may be described later through the count-up manner. That is, the initial value of the active count may be 0 by the count-up manner.

In operation S310, the active counter 220a may compare the active count A_count with the first reference count ref1. The first reference count ref1 may be a value greater than 0. When the active count A_count is equal to the first reference count ref1, the active counter 220a may perform operation S320, and when the active count A_count is different from the first reference count ref1, the active counter 220a may perform operation S210 again.

In operation S320, the active counter 220a may output the first initiation signal INIT_1 to the up scaling circuit 510. The first initiation signal INIT_1 may be an interrupt signal that triggers a frequency increase of the clock signal CLK.

Figure 8:
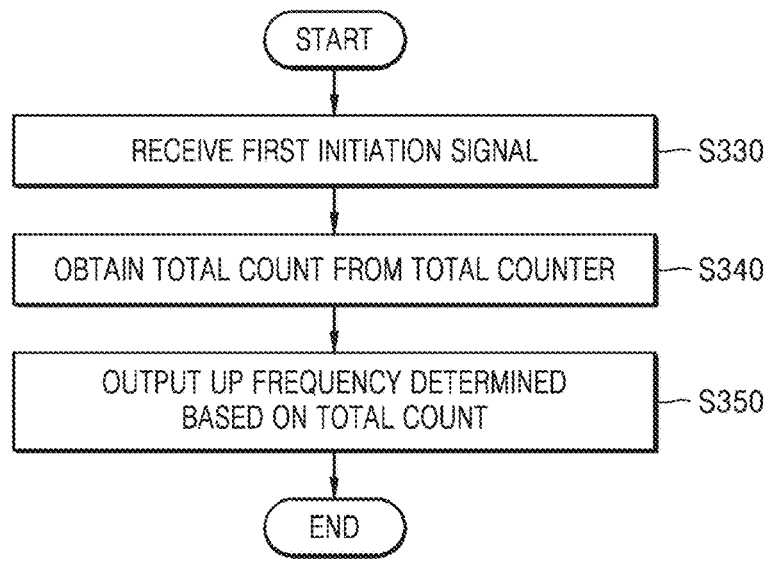
FIG. 8 is a flowchart illustrating an example of a method of operating an up scaling circuit, according to example embodiments of the inventive concepts.

FIG. 8 is a flowchart illustrating an example of a method of operating an up scaling circuit, according to example embodiments of the inventive concepts.

Referring to FIG. 8, the up scaling circuit 510 may output an up frequency up_FREQ by performing operations S330 to S350. In operation S330, the up scaling circuit 510 may receive the first initiation signal INIT_1 from the active counter 220a. The first initiation signal INIT_1 may be used as an interrupt signal. The up scaling circuit 510 may perform a frequency change operation through operations S340 and S350 in response to the first initiation signal INIT_1.

In operation S340, the up scaling circuit 510 may obtain a total count T_count from the total counter 230a. The utilization of the IP block 100 may be derived through the total count T_count when the first initiation signal INIT_1 is received. When the up scaling circuit 510 receives the first initiation signal INIT_1, the active count A_count may reach the first reference count ref1. When the number of active cycles is constant, the utilization of the IP block 100 may decrease as the number of total cycles increases. In the count-up manner, it may be understood that the larger the total count T_count, the lower the utilization, and it may be understood that the smaller the total count T_count, the higher the utilization. In the count-down manner, it may be understood that the smaller the total count T_count, the lower the utilization, and it may be understood that the larger the total count T_count, the higher the utilization.

In operation S350, the up scaling circuit 510 may output an up frequency up_FREQ determined based on the total count T_count. For example, the up scaling circuit 510 may obtain an up frequency up_FREQ corresponding to the obtained total count T_count by referring to the up scaling table 520. The up scaling circuit 510 may output the up frequency up_FREQ to the frequency controller 240.

Figure 9:
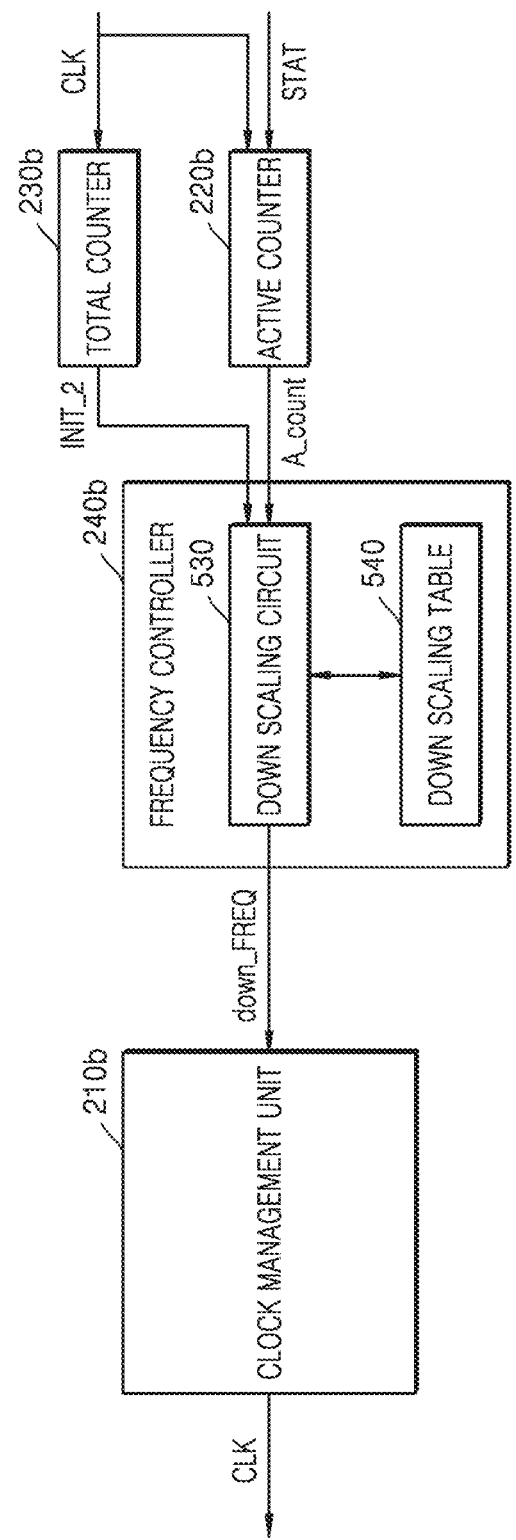
FIG. 9 is a diagram illustrating a process of decreasing a frequency, according to example embodiments of the inventive concepts.

FIG. 9 is a diagram illustrating a process of decreasing a frequency, according to example embodiments of the inventive concepts.

Referring to FIG. 9, a frequency controller 240b may include a down scaling circuit 530 and a down scaling table 540. The down scaling circuit 530 may receive a second initiation signal INIT_2 from a total counter 230b and output a down frequency down_FREQ that is lower than an existing frequency of a clock signal CLK. The down scaling circuit 530 may receive the second initiation signal INIT_2 and obtain an active count A_count from an active counter 220b. For convenience of description, the total count T_count and the active count A_count may be described later as being determined according to a count-up manner. However, example embodiments of the inventive concepts are not limited thereto, and the total count T_count and the active count A_count may be determined according to a count-down manner.

The down scaling circuit 530 may obtain a down frequency down_FREQ corresponding to the active count A_count by referring to the down scaling table 540. When the active count A_count obtained in response to the second initiation signal INIT_2 is relatively small, it may be understood that the ratio of an active cycle to a total cycle is relatively low. Therefore, it may be understood that the utilization of the IP block 100 is relatively low. When the active count A_count acquired in response to the second initiation signal INIT_2 is relatively large, it may be understood that the ratio of the active cycle to the total cycle is relatively high. Accordingly, it may be understood that the utilization of the IP block 100 is relatively high. That is, the utilization of the IP block may be derived at a time point at which the second initiation signal INIT_2 is output through the active count A_count.

In some example embodiments, the down scaling circuit 530 may calculate the down frequency down_FREQ based on the active count A_count without referring to the down scaling table 540. For example, the down scaling circuit 530 may calculate the down frequency down_FREQ by subtracting a larger offset from an existing frequency as the active count A_count decreases. Alternatively, the down scaling circuit 530 may calculate the down frequency down_FREQ by multiplying a smaller gain by the existing frequency as the active count A_count decreases.

A clock management unit 210b may receive the down frequency down_FREQ from the down scaling circuit 530 and output a clock signal CLK having the down frequency down_FREQ.

Figure 10:
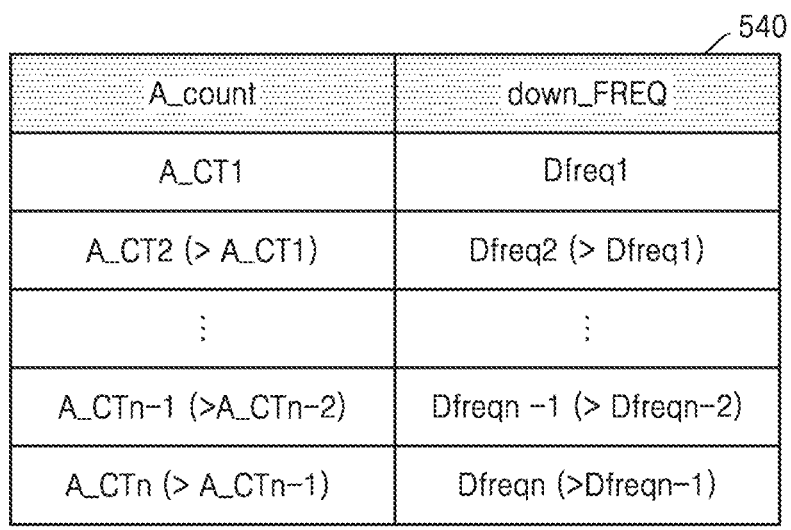
FIG. 10 is a diagram illustrating a down scaling table according to example embodiments of the inventive concepts.

FIG. 10 is a diagram illustrating a down scaling table according to example embodiments of the inventive concepts.

Referring to FIG. 10, a down scaling table 540 may include a relationship between an active count A_count and a down frequency down_FREQ. The active count A_count may be one of first to n-th active counts A_CT1 to A_CTn, and the down frequency down_FREQ may be one of first to n-th down frequencies Dfreq1 to Dfreqn. The first to n-th active counts A_CT1 to A_CTn may correspond to the first to n-th down frequencies Dfreq1 to Dfreqn, respectively.

An active count A_count that is relatively large may correspond to a down frequency down_FREQ that is relatively high. For example, the n-th active count A_CTn may be greater than the (n−1)-th active count A_CTn−1, and the n-th down frequency Dfreqn may be greater than the (n−1)-th down frequency Dreqn−1.

The utilization of the IP block 100 may be derived by an active count A_count obtained in response to the second initiation signal INIT_2. That is, when the total count T_count reaches the second reference count ref2, it may be understood that the active count A_count and the utilization of the IP block 100 are inversely proportional to each other. Accordingly, the down scaling circuit 530 according to example embodiments of the inventive concepts may obtain an active count A_count in response to the second initiation signal INIT_2 and may perform a DVFS operation according to the utilization of the IP block 100 by outputting a down frequency down_FREQ corresponding to the active count A_count.

Figure 11:
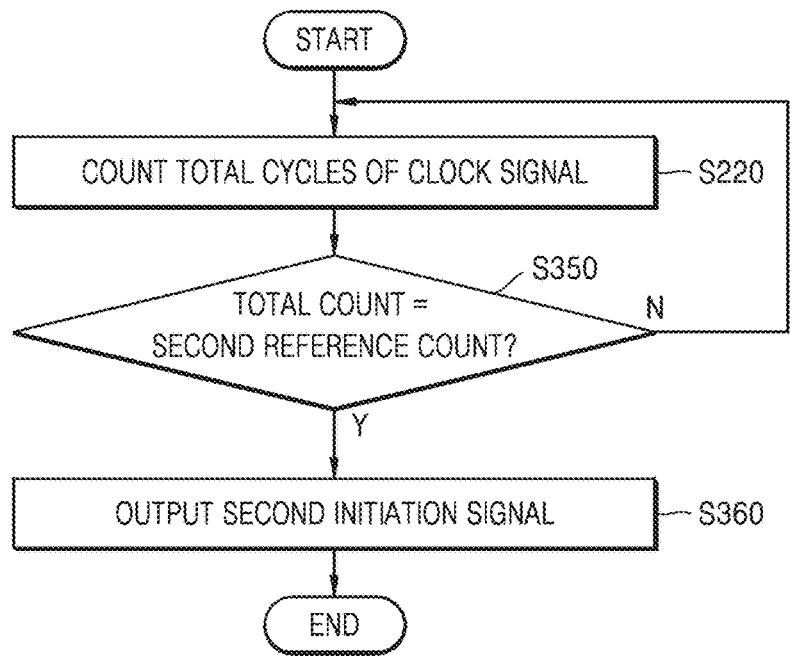
FIG. 11 is a flowchart illustrating an example of a method of operating a total counter, according to example embodiments of the inventive concepts.

FIG. 11 is a flowchart illustrating an example of a method of operating a total counter, according to example embodiments of the inventive concepts.

Referring to FIG. 11, in operation S220, the total counter 230b may count total cycles of the clock signal CLK. For example, in the count-up manner, as the number of total cycles increases together with the toggle of the clock signal CLK, the total counter 230b may increase the total count T_count. That is, when the number of total cycles increases by 1, the total count T_count may also increase by 1. In the count-down manner, as the number of total cycles increases together with the toggle of the clock signal CLK, the total counter 230b may decrease the total count T_count. That is, when the number of total cycles increases by 1, the total count T_count may decrease by 1. For convenience of description, a method of operating the total counter 230b may be described later through the count-up manner. That is, the initial value of the total count may be 0 by the count-up manner.

In operation S350, the total counter 230b may compare the total count T_count with the second reference count ref2. The second reference count ref2 may be a value greater than 0. When the total count T_count is equal to the second reference count ref2, the total counter 230b may perform operation S360, and when the total count T_count is different from the second reference count ref2, the total counter 230b may perform operation S220 again.

In operation S360, the total counter 230b may output the second initiation signal INIT_2 to the down scaling circuit 530. The second initiation signal INIT_2 may be an interrupt signal that triggers a frequency decrease of the clock signal CLK.

Figure 12:
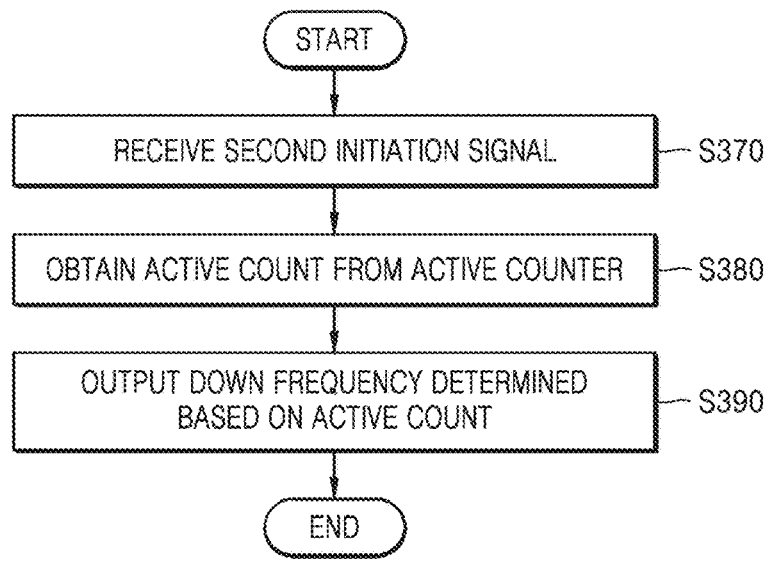
FIG. 12 is a flowchart illustrating an example of a method of operating a down scaling circuit, according to example embodiments of the inventive concepts.

FIG. 12 is a flowchart illustrating an example of a method of operating a down scaling circuit, according to example embodiments of the inventive concepts.

Referring to FIG. 12, the down scaling circuit 530 may output a down frequency down_FREQ by performing operations S370 to S390. In operation S370, the down scaling circuit 530 may receive the second initiation signal INIT_2 from the total counter 230b. The second initiation signal INIT_2 may be used as an interrupt signal. The down scaling circuit 530 may perform a frequency change operation through operations S380 and S390 in response to the second initiation signal INIT_2.

In operation S380, the down scaling circuit 530 may obtain an active count A_count from the active counter 220b. The utilization of the IP block 100 may be derived through the active count A_count when the second initiation signal INIT_2 is received. When the down scaling circuit 530 receives the second initiation signal INIT_2, the total count T_count may reach the second reference count ref2. When the number of total cycles is constant, the utilization of IP block 100 may increase as the number of active cycles increases. In the count-up manner, it may be understood that the larger the active count A_count, the higher the utilization, and it may be understood that the smaller the active count A_count, the lower the utilization. In the count-down manner, it may be understood that the smaller the active count A_count, the higher the utilization, and it may be understood that the larger the active count A_count, the lower the utilization.

In operation S390, the down scaling circuit 530 may output a down frequency down_FREQ determined based on the active count A_count. For example, the down scaling circuit 530 may obtain a down frequency down_FREQ corresponding to the obtained active count A_count by referring to the down scaling table 540. The down scaling circuit 530 may output the down frequency down_FREQ to the frequency controller 240.

In the method of operating a down scaling circuit, according to example embodiments of the inventive concepts, the active count A_count may be obtained in response to the second initiation signal INIT_2 and the down frequency down_FREQ may be determined based on the active count A_count, and accordingly, a DVFS operation may be performed more simply than a method of calculating the utilization by using both the active count A_count and the total count T_count.

Figure 13:
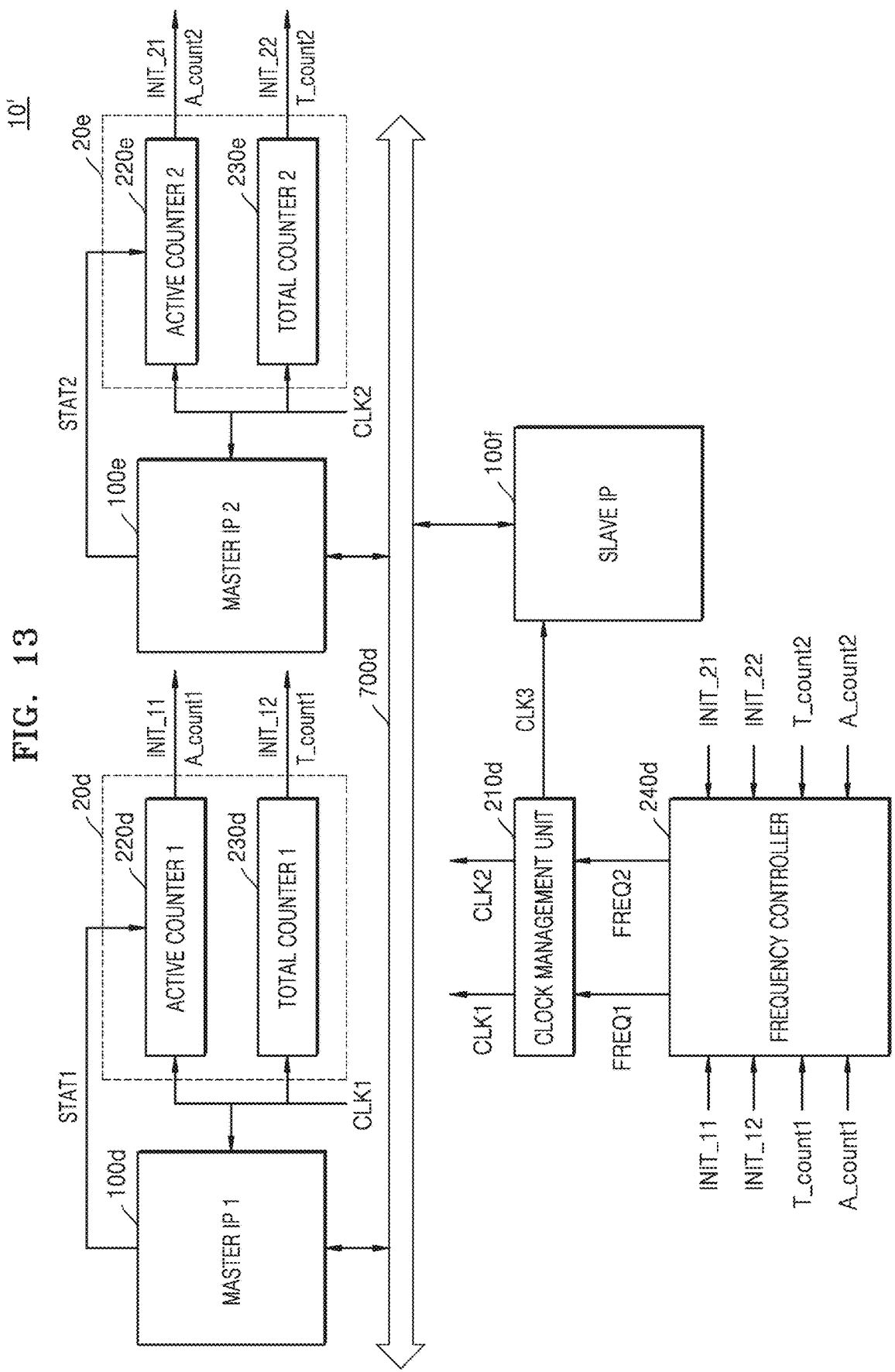
FIG. 13 is a diagram illustrating an electronic device according to example embodiments of the inventive concepts.

FIG. 13 is a diagram illustrating an electronic device 10' according to example embodiments of the inventive concepts. Referring to FIG. 13, the electronic device 10' may include a plurality of master IP devices, that is, first and second master IP devices 100d and 100e, and a slave IP device 100f. Each of the first and second master IP devices 100d and 100e may be a device that outputs a task request, and the slave IP device 100f may be a device that receives the task request. For example, each of the first and second master IP devices 100d and 100e may be a device that outputs commands such as a write command, a read command, and an erase command, and the slave IP device 100f may be a device that receives the commands and performs operations corresponding to the commands. Each of the first and second master IP devices 100d and 100e may be one of a CPU, a GPU, an NPU, or an ISP. The slave IP device 100f may be a memory interface device. Each of the first and second master IP devices 100d and 100e and the slave IP device 100f may exchange a task request through a bus 700d.

The first master IP device 100d may output a task request according to a first clock signal CLK1, and the second master IP device 100e may output a task request according to a second clock signal CLK2. The slave IP device 100f may receive the task request according to a third clock signal CLK3. A clock management unit 210d may generate the first to third clock signals CLK1 to CLK3 and provide the generated first and second clock signals to the first and second master IP devices 100d and 100e and the slave IP devices 100f. Because the slave IP device 100f receives the task request according to the third clock signal CLK3, the third clock signal CLK3 may be changed, based on the number of task requests output by the first and second master IP devices 100d and 100e, to improve the performance of the electronic device 10'. That is, the frequency of the third clock signal CLK3 may be changed based on the utilization of the first and second master IP devices 100d and 100e.

The electronic device 10' may include a counter group corresponding to each of the first and second master IP devices 100d and 100e. The counter group may include an active counter and a total counter. For example, a first counter group 20d may correspond to the first master IP device 100d, and a second counter group 20e may correspond to the second master IP device 100e. The first counter group 20d may include a first active counter 220d and a first total counter 230d, and the second counter group 20e may include a second active counter 220e and a second total counter 230e. The counter group may count cycles of a clock signal applied to a corresponding master IP device. For example, the first active counter 220d may generate a first active count A_count1 by counting active cycles of the first clock signal CLK1, and the first total counter 230d may generate a first total count T_count1 by counting total cycles of the first clock signal CLK1. The second active counter 220e may generate a second active count A_count2 by counting active cycles of the second clock signal CLK2, and the second total counter 230e may generate a second total count T_count2 by counting total cycles of the second clock signal CLK2.

The first active counter 220d may compare the first active count A_count1 with a third reference count ref3 and output a first initiation signal INIT_11 according to a result of the comparison. The first total counter 230d may compare the first total count T_count1 with a fourth reference count ref4 and output a second initiation signal INIT_12 according to a result of the comparison. The second active counter 220e may compare the second active count A_count2 with a fifth reference count ref5 and output a third initiation signal INIT_21 according to a result of the comparison. The second total counter 230e may compare the second total count T_count2 with a sixth reference count ref6 and output a fourth initiation signal INIT_22 according to a result of the comparison.

A frequency controller 240d may receive the first to fourth initiation signals INIT_11 to INIT_22 and output changed frequencies (e.g., a first frequency FREQ1 and a second frequency FREQ2) of the third clock signal CLK3. The first frequency FREQ1 may be generated in response to the first and second initiation signals INIT_11 and INIT_12, and the second frequency FREQ2 may be generated in response to the third and fourth initiation signals INIT_21 and INIT_22. That is, the first frequency FREQ1 may be generated based on the first and second initiation signals INIT_11 and INIT_12 of the first counter group 20d corresponding to the first master IP device 100d, and the second frequency FREQ2 may be generated based on the third and fourth initiation signals INIT_21 and INIT_22 of the second counter group 20e corresponding to the second master IP device 100e. Each of the first frequency FREQ1 and the second frequency FREQ2 may be one of the up frequency up_FREQ and the down frequency down_FREQ described above with reference to FIGS. 5 to 12.

A deviation of the utilization of the first master IP device 100d and a deviation of the utilization of the second master IP device 100e may be different from each other. The deviation may be a value indicating a degree of dispersion from an average value. That is, a degree of change in the utilization of the first master IP device 100d and a degree of change in the utilization rate of the second master IP device 100e may be different from each other. The number of task requests output from a master IP device having a relatively large deviation in utilization may rapidly increase or rapidly decrease. Accordingly, when the frequency of the third clock signal CLK3 is changed by a counter group corresponding to a master IP device having a large deviation in utilization, the amount of frequency variation may be relatively large. This is because the number of task requests received from the master IP device may rapidly change due to the large deviation in utilization. Accordingly, by considering the deviation in utilization, the amount of variation in which the frequency of the third clock signal CLK3 is changed by the first and second initiation signals INIT_11 and INIT_12 may be different from the amount of variation in which the frequency of the third clock signal CLK3 is changed by the third and fourth initiation signals INIT_21 and INIT_22. As a result, depending on a deviation in the utilization of a master IP device, the amount of variation in the frequency of a clock signal provided to a slave IP device may vary.

Figure 14:
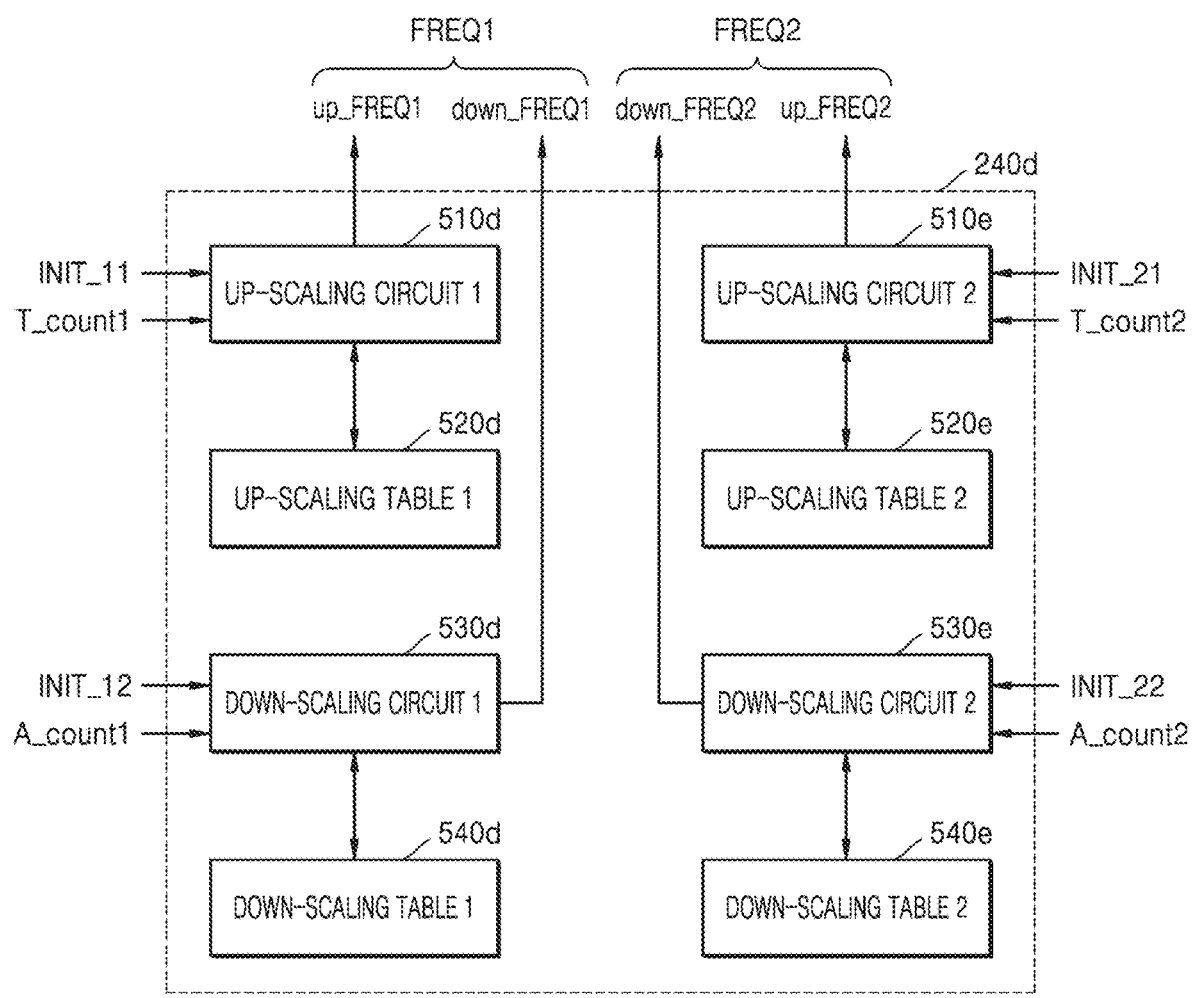
FIG. 14 is a block diagram illustrating a frequency controller according to example embodiments of the inventive concepts.

FIG. 14 is a block diagram illustrating a frequency controller according to example embodiments of the inventive concepts. Referring to FIG. 14, a frequency controller 240d may include a first up scaling circuit 510d, a first down scaling circuit 530d, a second up scaling circuit 510e, and/or a second down scaling circuit 530e.

The first up scaling circuit 510d may receive a first initiation signal INIT_11 and obtain a first total count T_count1. The first up scaling circuit 510d may determine a first up frequency up_FREQ1 corresponding to the first total count T_count1 by referring to a first up scaling table 520d. The first down scaling circuit 530d may receive a second initiation signal INIT_12 and obtain a first active count A_count1. The first down scaling circuit 530d may determine a first down frequency down_FREQ1 corresponding to the first active count A_count1 by referring to a first down scaling table 540d. The first up frequency up_FREQ1 and the first down frequency down_FREQ1 may be referred to as the first frequency FREQ1 of FIG. 13.

The second up scaling circuit 510e may receive a third initiation signal INIT_21 and obtain a second total count T_count2. The second up scaling circuit 510e may output a second up frequency up_FREQ2 corresponding to the second total count T_count2 by referring to a second up scaling table 520e. The second down scaling circuit 530e may receive a fourth initiation signal INIT_22 and obtain a second active count A_count2. The second down scaling circuit 530e may output a second down frequency down_FREQ2 corresponding to the second active count A_count2 by referring to a second down scaling table 540e. The second up frequency up_FREQ2 and the second down frequency down_FREQ2 may be referred to as the second frequency FREQ2 of FIG. 13.

The first and second up scaling circuits 510d and 510e may be example embodiments of the up scaling circuit described above with reference to FIGS. 1 to 13. As described above with reference to FIG. 13, depending on a deviation in the utilization of a master IP device, the amount of variation in the frequency of a clock signal provided to a slave IP device may vary. That is, the first up frequency up_FREQ1 output from the first up scaling circuit 510d may be different from the second up frequency up_FREQ2 output by the second up scaling circuit 510e. In addition, the first down frequency down_FREQ1 output by the first down scaling circuit 530d may be different from the second down frequency down_FREQ2 output by the second down scaling circuit 530e.

The number of task requests output by a master IP device having a relatively large deviation in utilization may rapidly change. In order to process a rapidly changing number of task requests, the frequency of the third clock signal CLK3 provided to the slave IP device 100f may be changed to have a relatively short period. Conversely, the number of task requests output by a master IP device having a relatively small deviation in utilization may gradually change. In order to process a gradually changing number of task requests, the frequency of the third clock signal CLK3 provided to the slave IP device 100f may be changed to have a relatively long period.

As described above with reference to FIG. 13, the deviation of the utilization of the first master IP device 100d and the deviation of the utilization of the second master IP device 100e may be different from each other. Therefore, a frequency change time point of the third clock signal CLK3 requested by the first master IP device 100d and a frequency change time point of the third clock signal CLK3 requested by the second master IP device 100e may be different from each other.

The frequency change time point may be related to a reference count. For example, the third reference count ref3 and the fifth reference count ref5 may be different from each other such that a frequency increase time point of the third clock signal CLK3 requested by the first master IP device 100d and a frequency increase time point of the third clock signal CLK3 requested by the second master IP device 100e are different from each other. Similarly, the fourth reference count ref4 and the sixth reference count ref6 may be different from each other such that a frequency decrease time point of the third clock signal CLK3 requested by the first master IP device 100d and a frequency decrease time point of the third clock signal CLK3 requested by the second master IP device 100e are different from each other.

Figure 15:
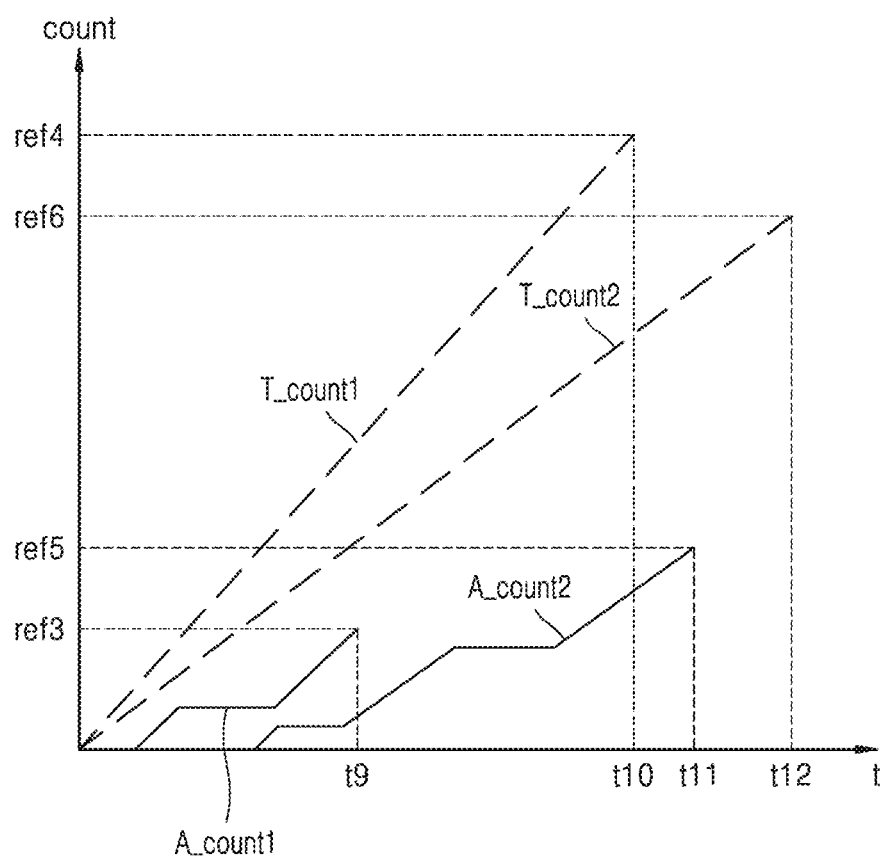
FIG. 15 is a diagram illustrating a frequency change time point according to example embodiments of the inventive concepts.

FIG. 15 is a diagram illustrating a frequency change time point according to example embodiments of the inventive concepts. Referring to FIG. 15, first and second total counts T_count1 and T_count2 and first and second active counts A_count1 and A_count2 may increase with time. That is, although FIG. 15 illustrates a count-up manner, example embodiments of the inventive concepts are not limited thereto.

The first active count A_count1 may reach a third reference count ref3 at a ninth time point t9. Accordingly, the first active counter 220d may provide the first initiation signal INIT_11 to the frequency controller 240d at the ninth time point t9. The first total count T_count1 may reach a fourth reference count ref4 at a tenth time point t10. Accordingly, the first total counter 230d may provide the second initiation signal INIT_12 to the frequency controller 240d at the tenth time point t10. The second active count A_count2 may reach a fifth reference count ref5 at an eleventh time point t11. Accordingly, the second active counter 220e may provide the third initiation signal INIT_21 to the frequency controller 240d at the eleventh time point tn. The second total count T_count2 may reach a sixth reference count ref6 at a twelfth time point t12. Accordingly, the second total counter 230e may provide the fourth initiation signal INIT_22 to the frequency controller 240d at the twelfth time point t12.

As shown in FIG. 15, the third reference count ref3 and the fifth reference count ref5 may be different from each other. Accordingly, a time point at which the frequency of the third clock signal CLK3 is increased by the first active counter 220d may be different from a time point at which the frequency of the third clock signal CLK3 is increased by the second active counter 220e. Also, the fourth reference count ref4 and the sixth reference count ref6 may be different from each other. Accordingly, a time point at which the frequency of the third clock signal CLK3 is decreased by the first total counter 230d may be different from a time point at which the frequency of the third clock signal CLK3 is decreased by the second total counter 230e.

That is, according to example embodiments of the inventive concepts, a frequency change time point may vary depending on which master IP device a counter that triggers a change of the frequency of a clock signal provided to a slave IP device corresponds to.

Figure 16:
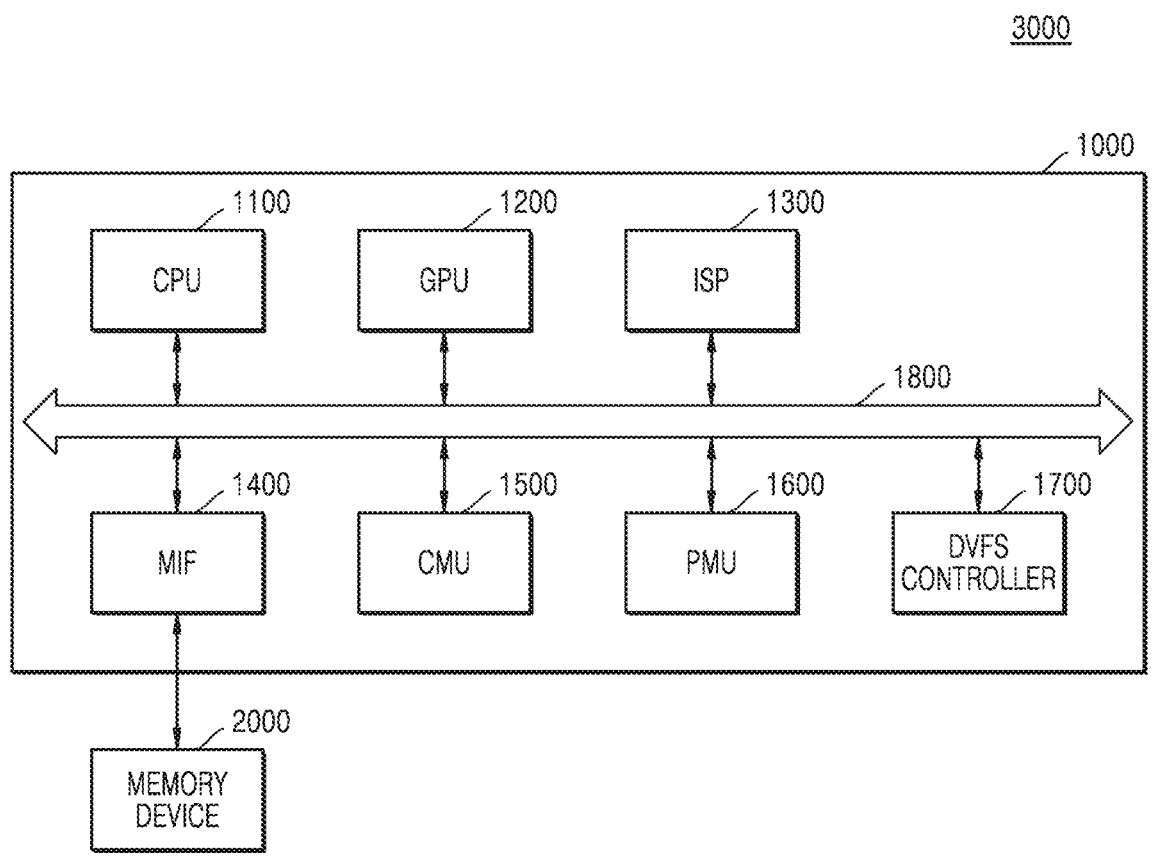
FIG. 16 is a block diagram illustrating an electronic system according to example embodiments of the inventive concepts.

FIG. 16 is a block diagram illustrating an electronic system 3000 according to example embodiments of the inventive concepts. Referring to FIG. 16, the electronic system 3000 may be implemented as a handheld device, such as a mobile phone, a smartphone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book.

The electronic system 3000 may include a system on chip (SoC) 1000 and a memory device 2000. The SoC 1000 may include a CPU 1100, a GPU 1200, an ISP 1300, a memory interface (MIF) 1400, a clock management unit (CMU) 1500, a power management unit (PMU) 1600, and/or a DVFS controller 1700. The CPU 1100, the GPU 1200, or the ISP 1300 may be a master IP device, and the MIF 1400 may be a slave IP device.

The CPU 1100 may process or execute instructions and/or data stored in the memory device 2000 in response to a clock signal generated by the CMU 1500. The CPU 1100 may be implemented as a multi-core processor. The multi-core processor may be one computing component having two or more independent processor cores, and the processor cores may independently read and execute instructions.

The GPU 1200 may obtain image data stored in the memory device 2000, in response to a clock signal generated by the CMU 1500. The GPU 1200 may generate data for an image output through a display device (not shown) from image data provided from the MIF 1400 or may encode image data.

The ISP 1300 may perform a signal processing operation on raw data received from an image sensor (not shown) located outside the SoC 1000 and generate digital data having improved image quality.

The MIF 1400 may provide an interface for the memory device 2000 located outside the SoC 1000. The memory device 2000 may be dynamic random access memory (DRAM), phase-change random access memory (PRAM), resistive random access memory (ReRAM), or a flash memory.

The CMU 1500 may generate a clock signal and provide the clock signal to components of the SoC 1000. The CMU 1500 may include a clock generation device such as a PLL, a DLL, and a crystal oscillator. The PMU 1600 may convert an external power source into an internal power source and supply the internal power source to the components of the SoC 1000 as power.

The DVFS controller 1700 may control the CMU 1500 to change the frequency of a clock signal provided to the components of the SoC 1000. The DVFS controller 1700 may control the PMU 1600 to change power provided to the components of the SoC 1000. The components of the SoC 1000 may communicate with each other through a bus 1800.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An electronic device comprising:
   a clock management unit configured to generate a clock signal;
   an intellectual property (IP) device configured to receive the clock signal and perform a task in an active state according to the clock signal;
   a first counter configured to count cycles of the clock signal while the IP device is in the active state;
   a second counter configured to count cycles of the clock signal regardless of the active state of the IP device; and
   a frequency controller configured to control the clock management unit to,
   in response to a first count corresponding to a number of the cycles of the clock signal counted by the first counter reaching a first reference count, increase a frequency of the clock signal by a first value inversely proportional to a second count corresponding to a number of the cycles of the clock signal counted by the second counter, and
   in response to the second count counted by the second counter reaching a second reference count, decrease the frequency of the clock signal by a second value inversely proportional to the first count.

2. The electronic device of claim 1, wherein a time point at which the first count reaches the first reference count and a time point at which the second count reaches the second reference count are different from each other.

3. The electronic device of claim 1, wherein the first counter is configured to output a first initiation signal based on the first count and the first reference count, and
   wherein the frequency controller includes an up scaling circuit configured to control the clock management unit to increase the frequency of the clock signal in response to the first initiation signal.

4. The electronic device of claim 3, wherein the up scaling circuit is configured to obtain the second count from the second counter in response to the first initiation signal and provide the clock management unit with an up frequency determined based on the second count.

5. The electronic device of claim 4, further comprising:
   an up scaling table configured to indicate a relationship between the second count and the up frequency,
   wherein the up scaling circuit is configured to
   refer to the up scaling table to obtain the second count, and
   determine a first frequency as the up frequency when the second count has a first value and a second frequency as the up frequency when the second count has a second value, where the first value is smaller than the second value and the first frequency is greater than the second frequency.

6. The electronic device of claim 1, wherein
   the second counter is configured to output a second initiation signal based on a second count and the second reference count, and
   the frequency controller includes a down scaling circuit configured to control the clock management unit to decrease the frequency of the clock signal in response to the second initiation signal.

7. The electronic device of claim 6, wherein the down scaling circuit is configured to obtain the first count from the first counter in response to the second initiation signal and provide the clock management unit with a down frequency determined based on the first count.

8. The electronic device of claim 7, further comprising:
a down scaling table configured to indicate a relationship between the first count and the down frequency,
wherein the down scaling circuit is configured to
refer to the down scaling table to obtain the first count, and
determine a first frequency as the down frequency when the first count has a first value and a second frequency as the down frequency when the second count has a second value, where the first value is smaller than the second value and the first frequency is smaller than the second frequency.

9. An electronic device comprising:
a clock management unit configured to generate a first clock signal and a second clock signal;
a first intellectual property (IP) device configured to receive the first clock signal and output a task request in an active state according to the first clock signal;
a second IP device configured to receive the task request from the first IP device according to the second clock signal;
a first active counter configured to generate a first active count by counting cycles of the first clock signal received by the first IP device while the first IP device is in the active state and output a first initiation signal when the first active count reaches a first reference count;
a first total counter configured to generate a first total count by counting, regardless of the active state of the first IP device, the cycles of the first clock signal received by the first IP device and output a second initiation signal when the first total count reaches a second reference count; and
a frequency controller configured to control the clock management unit to,
in response to the second initiation signal, decrease a frequency of the second clock signal by a first value inversely proportional to a value of the first active count, and
in response to the first initiation signal, increase the frequency of the second clock signal by a second value inversely proportional to a value of the first total count.

10. The electronic device of claim 9, wherein the frequency controller includes a first up scaling circuit configured to control the clock management unit to increase the frequency of the second clock signal, in response to the first initiation signal.

11. The electronic device of claim 10, wherein the first up scaling circuit is configured to obtain the first total count from the first total counter and provide the clock management unit with an up frequency determined based on the first total count.

12. The electronic device of claim 9, wherein the frequency controller includes a first down scaling circuit configured to control the clock management unit to decrease the frequency of the second clock signal, in response to the second initiation signal.

13. The electronic device of claim 12, wherein the first down scaling circuit is configured to obtain the first active count from the first active counter and provide the clock management unit with a down frequency determined based on the first active count.

14. The electronic device of claim 9, wherein the clock management unit is configured to generate a third clock signal, the electronic device further comprising:
a third IP device configured to receive the third clock signal and output a task request according to the third clock signal in the active state;
a second active counter configured to generate a second active count by counting cycles of the third clock signal received by the third IP device while the third IP device is in the active state and output a third initiation signal when the second active count reaches a third reference count; and
a second total counter configured to generate a second total count by counting the cycles of the third clock signal received by the third IP device and output a fourth initiation signal when the second total count reaches a fourth reference count,
wherein the frequency controller includes,
a second up scaling circuit configured to control the clock management unit to increase the frequency of the second clock signal, in response to the third initiation signal, and
a second down scaling circuit configured to control the clock management unit to decrease the frequency of the second clock signal, in response to the fourth initiation signal.

15. The electronic device of claim 14, wherein
the first reference count and the third reference count are different from each other, and
the second reference count and the fourth reference count are different from each other.

16. The electronic device of claim 14, wherein a frequency of the second clock signal that is changed in response to the first initiation signal is different from a frequency of the second clock signal that is changed in response to the third initiation signal.

17. A method of operating an electronic device, the method comprising:
setting, to initial values, an active count corresponding to a number of active cycles of a clock signal provided to an intellectual property (IP) device and a total count corresponding to a number of total cycles of the clock signal;
counting the active cycles and the total cycles of the clock signal and increasing the active count based on the counted active cycles;
counting the total cycles of the clock signal regardless of the active cycles of a clock cycle provided to the IP device and increasing the total count based on the counted total cycles;
in response to the active count reaching a first reference count, increasing a frequency of the clock signal by a first value inversely proportional to a value of the total count; and
in response to the total count reaching a second reference count, decreasing the frequency of the clock signal by a second value inversely proportional to a value of the active count.

18. The method of claim 17, wherein the increasing of the frequency of the clock signal includes:
obtaining the total count when the active count reaches the first reference count; and determining a level at which the frequency of the clock signal is increased, based on the total count.

* * * * *